Nov. 22, 1966  A. E. CLARKE, JR., ET AL  3,286,693
METHOD OF MAKING AND USING AN ANIMAL RESTRAINT
Filed May 4, 1964  2 Sheets-Sheet 1
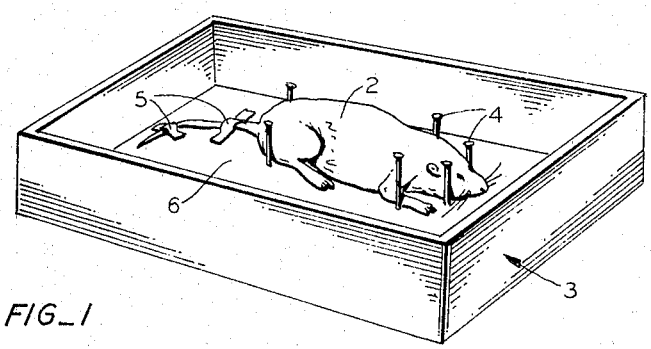
FIG_1
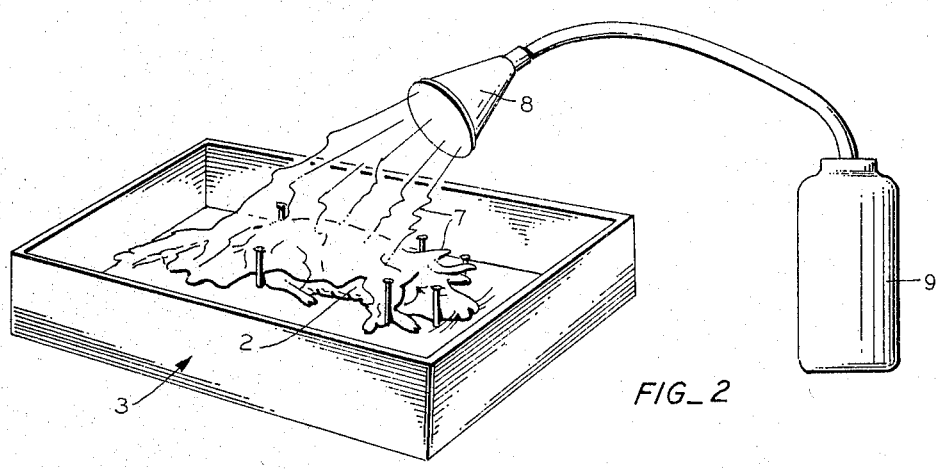
FIG_2
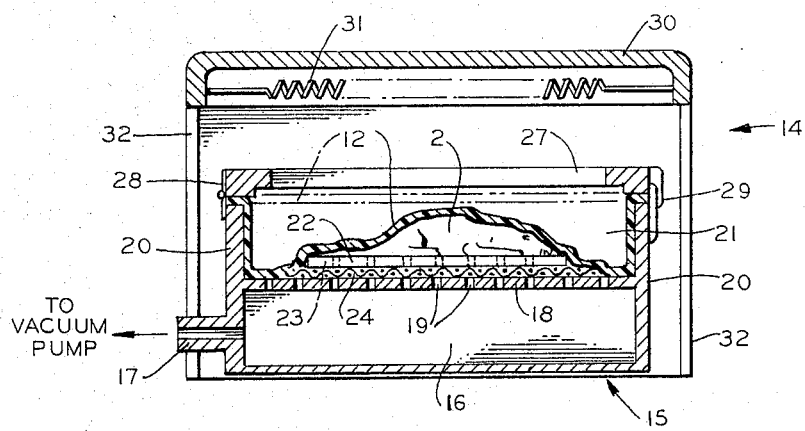
FIG_3
INVENTORS
ALBERT E. CLARKE JR.
JOHN M. RIETMAN
BY
ATTORNEYS Nov. 22, 1966  A. E. CLARKE, JR., ET AL  3,286,693
METHOD OF MAKING AND USING AN ANIMAL RESTRAINT
Filed May 4, 1964  2 Sheets-Sheet 2
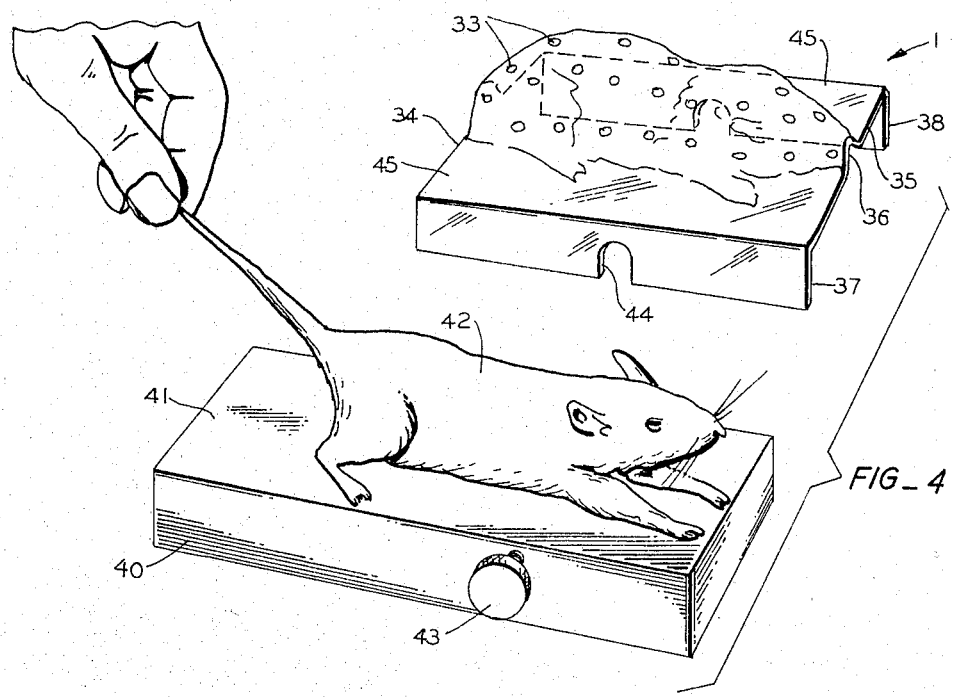
FIG_4
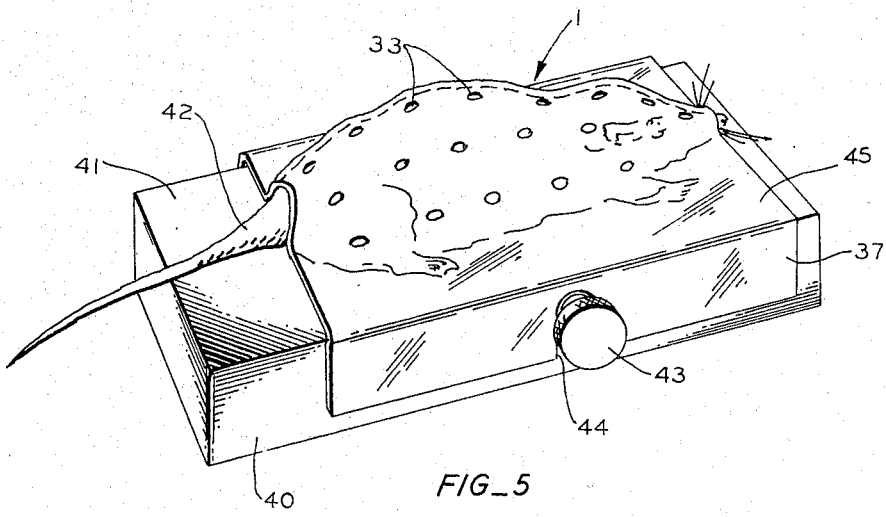
FIG_5
INVENTORS
ALBERT E. CLARKE JR.
JOHN M. RIETMAN
BY
ATTORNEYS

United States Patent Office 3,286,693
Patented Nov. 22, 1966

3,286,693
METHOD OF MAKING AND USING AN ANIMAL RESTRAINT
Albert E. Clarke, Jr., 25470 Elena, Los Altos Hills, Calif., and John M. Rietman, 675 E. McKinley Ave., Sunnyvale, Calif.
Filed May 4, 1964, Ser. No. 364,860
5 Claims. (Cl. 119—103)

The invention described herein may be manufactured and used by or for the Government of the United States of America for governmental purposes without the payment of any royalties thereon or therefor.

This invention relates to the problem of holding animals in specific positions for the purpose of conducting tests or performing operations on the animals.

Numerous proposals have been made in the past to provide animal restraints and some have been successful for limited purposes. However, substantial improvements are supplied by the present invention, particularly in the fields of biology, life science, and medical research where animals are used for radiation tests, centrifuge work and related studies.

For example, one of the objects of the invention is to provide an improved animal restraint which will hold an animal firmly in an exact desired position and at the same time hold the animal in a manner which is as comfortable as possible for the animal.

A related object of the invention is to provide an improved animal restraint in which the animal cannot injure himself by attempting to escape.

Another object of the invention is to provide a fast and economical method for producing animal restraints.

A further object of the invention is to provide an improved animal restraint with which animals can be easily and quickly restrained.

An additional object of the invention is to provide an animal restraint system which is particularly adapted to restrain the animal in a unit that can be easily mounted in test apparatus.

Another object of the invention is to provide an animal restraint which is particularly capable of use with small animals such as mice which are extremely supple and difficult to grip or confine.

A further object of the invention is to provide a method of making animal restraints which will provide restraints meeting the objectives recited in the preceding paragraphs.

By way of brief description an animal restraint is made according to the invention in the following manner, wherein the object is to restrain a specific animal in a specific position: an animal of the same type and substantially the same size is employed in the formation of the restraint. The restrain-forming animal, preferably in deceased condition, is arranged in the desired position and then frozen in that shape. Next a formable material such as a thermo-forming plastic sheet is formed to the exact shape of the restraint-forming animal. Upon removal of the formed sheet, it becomes a perfectly contoured restraint for all animals of the selected type and size.

Other and further objects and features of advantage will become apparent from the following detailed description wherein reference is made to the accompanying drawings in which:

FIGURE 1 is a perspective view of a mouse shaped into a desired position in a forming box;

FIGURE 2 is a perspective view showing the mouse being frozen in the position of FIG. 1;

FIGURE 3 is a cross sectional view through a thermoplastic forming device and showing a plastic sheet being formed against the frozen mouse after removal from the forming box and placement on a retainer-shaped pedestal. In FIG. 3, the original cold position of the sheet is shown in dot-dash lines;

FIGURE 4 is a perspective exploded view of the restraint system of the invention being employed to restrain a mouse; and FIGURE 5 is a side elevational view of a restraint system restraining a mouse in accordance with the invention.

Referring in more detail to the drawings, FIG. 4 shows an animal restraint 1 made according to the process shown in FIGS. 1-3. The details of the process will now be described with particular reference to restraining mice because these are perhaps the most difficult of all animals to restrain satisfactorily. However, it should be understood that the same basic method is applicable to all types of animals. The term animal as used throughout the specification and claims is used in its broad sense to include all living creatures other than humans.

As previously mentioned, the process according to the invention employs a restraint-forming animal. For example, in FIG. 1 the restraint-forming animal 2 is a deceased mouse which has been selected because it is substantially the same size as a group or colony of mice which are available for test purposes. The restraint-forming mouse is placed in a forming box 3 and is arranged in the position in which it will later be desired to have live mice assume for test purposes. The deceased mouse is held temporarily in the desired position by any convenient means, if required, such as nails 4 and tape 5 secured to the bottom 6 of box 3.

Next the mouse is frozen in the position in which he was placed in FIG. 1. FIG. 2 shows one preferred way of freezing the animal. As shown in FIG. 2 the freezing is performed by directing the expanding $CO_2$ gas 7 from the nozzle 8 of a conventional $CO_2$ fire extinguisher 9 down into the forming box. At this point it should be noted that the forming member 3 is preferably a box rather than a flat piece so that it will form a storage chamber to collect the cold $CO_2$ gas and achieve the freezing more quickly. There are, of course, other freezing methods in which a plain flat piece can be substituted for the box 3. For example, the positioned restraint-forming animal can be placed in a conventional freezing compartment until sufficiently frozen.

The purpose of the freezing step is to prepare the restraint-forming animal for the next step in which a formable material is formed to take the exact shape of the forming animal 2. In a preferred embodiment as shown in FIG. 3, the formable material is a thermo-forming plastic sheet 12, such as cellulose acetate butyrate. In order to perform the thermo-forming step, the forming animal 2 in frozen condition is placed in a conventional thermo-forming apparatus 14 shown in FIG. 3. The apparatus comprises a base 15 forming a vacuum chamber 16 adapted to be connected to a vacuum pump (not shown) by a fitting 17. The base also comprises a supporting partition 18 perforated with multiple holes 19. Side walls 20 of the base extend above the partition to form an animal receiving chamber 21. The frozen forming animal 2 is placed on a pedestal 22 having perforations 23 at least in the area beneath the animal 2. In order to provide for easy escape of air molecules from beneath the plastic sheet 12, the partition 18 is covered with a wire screen 24, and the pedestal 22 is placed on the screen 24. The main purpose of the pedestal 22 is to provide a form for shaping the part of the restraint beneath the animal as will be more fully explained hereinafter. In the specific example disclosed herein, the pedestal 22 has a rectangular shape to give the lower portion of the restraint the shape shown in FIG. 4.

In FIG. 3 the plastic sheet 12 in its original cold form is shown in dot-dash lines as supported by the apparatus before heating. Sheet 12 is supported by being clamped adjacent its periphery between the tops of the side walls 20 and the rim of top frame 27. Frame 27 is hinged along one edge to the base 15 by a hinge 28 and is secured to the base along the opposite wall by a plurality of latches 29. The center of the frame 27 is open to allow atmospheric pressure to engage the top of the plastic sheet 12. The remainder of the thermo-forming apparatus comprises an oven or heating hood 30 containing one or more electrical heating wires 31 and supported on legs 32, preferably four in number located one adjacent each corner of the base 15.

In order to perform the thermo-forming step, the frozen forming animal 2 is placed on the pedestal 22 and then positioned in the chamber 21 of the forming apparatus as shown in FIG. 3. Next a plastic sheet 12 is placed on top of walls 20 with the top frame 27 raised. The top frame is lowered and latched to seal the edges of the plastic sheet in place. Then the heater 31 is energized and a vacuum is pulled in chamber 16. As a result, the heat-softened plastic is forced downwardly by atmospheric pressure to conform itself exactly to the shape of the animal 2 and the pedestal 22. The sheet conforms in such precise detail that even the whiskers of the mouse are reproduced in exact copy in the formed sheet. The heat and vacuum are discontinued; the frame 27 is raised; and the formed sheet 12 is removed. The heated plastic sheet cools quickly upon contact with the cold animal and can be removed after about twenty seconds.

After the formed sheet is removed, various other operations can be performed as desired. For example, a plurality of aerating holes 33 can be made in the restraint 1 as shown in FIG. 4. Also, depending on the type of animal and the position of restraint, additional vents may be made to aid in respiration, feeding and watering. In the case of the specific mouse restraint described herein, the large formed plastic sheet is cut to leave only the shape of restraint shown in FIG. 4. More specifically, the large sheet 12 is cut away at one end of the mouse shape where the tail joins the body to form a rear edge 34 and is cut away at the other end of the mouse to form a front edge 35 having a small nose opening 36 to make breathing easier. In order to form the restraint 1 of FIG. 4, the large sheet 12 is cut off at the bottom of pedestal 22 to form the side walls 37 and 38. Thus, the restraint is specifically shaped for cooperation with a restraint support 40.

The restraint support 40 is a rectangular block which provides a surface 41 against which a live mouse 42 is clamped by the restraint 1 as shown in FIG. 5. In order to hold the restraint 1 and support 40 connected together, the support is provided on each side with a threaded hole in which a knurled thumb screw 43 is received, and the restraint is provided on each side with a slot 44 which fits over the shaft of its respective screw 43. It will be noted that the shape of support 40 matches the shape of pedestal 22 so that the surface 41 on which the live mouse 42 rests is the same shape as the surface on which the forming mouse 2 rests and so that the sides 37 and 38 of the restraint will fit snugly over the sides of the support 40.

In order to restrain an animal with the restraint system previously described, the live animal 42 is placed on the support 40. Then the restraint 1 is brought against the support so as to cage the animal firmly yet comfortably in a specific predetermined position. The restraint is positioned against the support so that the slots 41 fit over the screws 43. It should be noted that the live mouse cannot be clamped with excessive force because the restraint 1 has the flat abutment surface 45 which automatically seats the restraint on the support in the proper position. After the restraint is properly positioned, the thumb screws 43 are tightened to hold the restraint securely assembled with the support 40. Then the support can be clamped in any test apparatus such as centrifuge equipment. In another use, the restraint can be used to hold the animal while a localized area is being operated upon or treated, and for this purpose, the particular localized area is simply cut out of the restraint 1 to make a window. In addition, it should be understood that more than one plastic sheet can be prepared for one animal. For example, one sheet can be formed from one side of an animal and another sheet formed from the opposite side. When the two sheets are joined together they form a complete external shape of an animal. An animal to be restrained can then be sandwiched between the two formed sheets. Also, a plastic sheet formed by the invention to fit only a portion of an animal can be used in conjunction with harnessing and webbing to hold the animal to the plastic sheet and to related supports.

Although specific details of the present invention are shown and described herein, it is to be understood that modifications may be made therein without departing from the spirit and scope of the invention as set forth in the appended claims.

Having thus described the invention, what is claimed as new and desired to be secured by Letters Patent is:

1. A method of making an animal restraint for a specific type of animal comprising the steps of placing one animal in the position in which it is desired later to restrain other animals of the same type, freezing said one animal in said position, placing a formable plastic sheet over said one animal, forming said sheet by the application of differential fluid pressure on opposite sides thereof to conform to the shape of said one animal, and then removing said formed material.

2. A method of making an animal restraint for a specific type of animal comprising the steps of placing one animal in the position in which it is desired later to restrain other animals of the same type, freezing said one animal in said position, placing a thermo-formable plastic sheet over the frozen animal, inducing a reduced pressure on the animal side of the sheet and heating the sheet to conform the sheet to the shape of the frozen animal, and then removing the formed sheet after the heated sheet has taken form.

3. A method of restraining a specific animal in a specific position comprising the steps of placing a restraint-forming animal of the same type and substantially the same size in said position, freezing said restraint-forming animal in said position, placing a thermo-formable plastic sheet over the frozen animal, inducing a reduced pressure on the animal side of the sheet and heating the sheet to conform the sheet to the shape of the frozen animal, removing the formed sheet, and then fitting the formed sheet against said specific animal to restrain the animal in said position.

4. A method of making an animal restraint for restraining a specific animal in a specific position comprising the steps of placing a restraint-forming animal of the same type and substantially the same size in said position, freezing said restraint-forming animal in said position, placing the frozen animal on a pedestal, placing a thermo-formable plastic sheet over the frozen animal, inducing a reduced pressure on the animal side of the sheet and heating the sheet to conform the sheet to the shape of the animal and pedestal, and removing the formed sheet restraint.

5. A method of restraining an animal with the restraint as made in the method of claim 4 comprising the further step of placing said specific animal on a support shaped similar to said pedestal, placing said formed sheet over said support to confine the animal between said support and said sheet, and then connecting said support and said formed sheet together.

References Cited by the Examiner

UNITED STATES PATENTS

| | | | |
|---|---|---|---|
| 1,731,824 | 10/1929 | Mood | 119—96 X |
| 2,285,064 | 6/1942 | Straw | 296—222 |

(Other references on following page)

UNITED STATES PATENTS

| | | | |
|---|---|---|---|
| 2,428,977 | 10/1947 | Mares | 264—28 |
| 2,523,606 | 9/1950 | Young | 128—90 |
| 2,599,390 | 6/1952 | Huse | 242—151 |
| 2,705,475 | 4/1955 | Johnisee | 119—103 |
| 2,800,129 | 7/1957 | Van Swaay | 128—90 |
| 2,952,031 | 9/1960 | Breitkreutz | 119—96 X |
| 2,998,008 | 8/1961 | Klesa | 119—106 |
| 3,021,569 | 2/1962 | Lyman | 18—56 |
| 3,103,204 | 9/1963 | Greene | 119—103 |
| 3,150,640 | 9/1964 | Nevitt | 119—96 |
| 3,161,705 | 12/1964 | Kindseth et al. | 264—92 |

ALDRICH F. MEDBERY, *Acting Primary Examiner.*

SAMUEL KOREN, *Examiner.*